US012222667B2

(12) United States Patent
Arimura et al.

(10) Patent No.: US 12,222,667 B2
(45) Date of Patent: Feb. 11, 2025

(54) IMAGE FORMING SYSTEM

(71) Applicant: Canon Kabushiki Kaisha, Tokyo (JP)

(72) Inventors: Koji Arimura, Ibaraki (JP); Naoyuki Yamamoto, Chiba (JP); Kenichiro Kitajima, Ibaraki (JP); Shuichi Tamura, Ibaraki (JP); Ryota Fujioka, Chiba (JP); Yoshiro Tsukada, Chiba (JP); Shohei Okumura, Tokyo (JP); Takahiro Suzuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/968,224

(22) Filed: Oct. 18, 2022

(65) Prior Publication Data

US 2023/0127053 A1 Apr. 27, 2023

(30) Foreign Application Priority Data

Oct. 22, 2021 (JP) ................................ 2021-173230

(51) Int. Cl.
*G03G 15/20* (2006.01)

(52) U.S. Cl.
CPC ..... *G03G 15/2096* (2013.01); *G03G 15/2064* (2013.01); *G03G 15/2098* (2021.01)

(58) Field of Classification Search
CPC ................................................ G03G 15/2098
See application file for complete search history.

(56) References Cited

U.S. PATENT DOCUMENTS

2010/0119244 A1* 5/2010 Kitagawa ........... G03G 15/2064 399/21
2010/0165024 A1* 7/2010 Abergel ............... B41J 2/04588 347/10
2010/0264574 A1* 10/2010 Tyson ...................... B65H 3/44 271/3.14
2012/0051811 A1* 3/2012 Hosoi ................ G03G 15/2021 399/341

(Continued)

FOREIGN PATENT DOCUMENTS

JP 2018-69669 A 5/2018

OTHER PUBLICATIONS

Co-pending U.S. Appl. No. 17/968,206, filed Oct. 18, 2022.
Co-pending U.S. Appl. No. 17/969,011, filed Oct. 19, 2022.

*Primary Examiner* — Sevan A Aydin
(74) *Attorney, Agent, or Firm* — Venable LLP

(57) ABSTRACT

An image forming system includes an image forming apparatus, a varnish application apparatus, and a controller. The varnish application apparatus includes a varnish application unit configured to apply varnish to a recording material, a first conveyance unit configured to convey a recording material in a first conveyance path that passes through the varnish application unit, and a second conveyance unit configured to convey a recording material in a second conveyance path that does not pass through the varnish application unit. When failure is occurred to one or both of the varnish application unit and the first conveyance unit and failure is not occurred to the second conveyance unit, the controller is configured to permit execution of the second image forming job and to convey a recording material by the second conveyance unit in the varnish application apparatus.

3 Claims, 6 Drawing Sheets

(56) References Cited

U.S. PATENT DOCUMENTS

| | | | | |
|---|---|---|---|---|
| 2012/0123014 | A1* | 5/2012 | Chretien | G03G 15/2098 522/182 |
| 2014/0327924 | A1* | 11/2014 | Oakley | G06F 3/121 358/1.14 |
| 2015/0010337 | A1* | 1/2015 | Morinaga | G03G 15/2021 399/341 |
| 2015/0220040 | A1* | 8/2015 | Baar | B41J 2/2114 399/341 |
| 2017/0341355 | A1* | 11/2017 | Peiffer | B32B 27/08 |
| 2018/0134019 | A1* | 5/2018 | Peiffer | C08J 7/0427 |
| 2019/0030874 | A1* | 1/2019 | Peiffer | B32B 27/30 |
| 2022/0413405 | A1* | 12/2022 | Sato | G03G 15/2098 |

* cited by examiner

IMAGE FORMING SYSTEM

BACKGROUND OF THE INVENTION

Field of the Invention

The present invention relates to an image forming system including an image forming apparatus for forming an image on a recording material and a varnish application apparatus for applying varnish to the recording material on which the image has been formed.

Description of the Related Art

There has been proposed an image forming system including an image forming apparatus for forming an image on a recording material and a varnish application apparatus for applying varnish to the recording material on which the image has been formed (Japanese Patent Application Laid-Open Publication No. 2018-69669). The image forming system according to Japanese Patent Application Laid-Open Publication No. 2018-69669 is an inline system capable of performing an image forming process and a varnish application process to the recording material consistently when an image forming job is entered, by automatically conveying the recording material on which the image has been formed from the image forming apparatus to the varnish application apparatus.

Hitherto, in the conventional image forming system, if failure of the image forming apparatus or the varnish application apparatus is detected, failure of the apparatus is notified to a user by displaying a notice on a liquid crystal monitor or ringing an alarm, and the job will not be executed even if an image forming job is entered. If failure of the varnish application apparatus has occurred, not only the varnish application process to the recording material by the varnish application apparatus but also the image forming process to the recording material by the image forming apparatus, whose failure has not been detected, will not be executed. That is, the user could not use the image forming system until the varnish application apparatus has been repaired, such that there was a drawback that the productivity of the image forming system was deteriorated.

The present invention aims at providing an image forming system capable of suppressing deterioration of productivity of an image forming system in a case where failure of the varnish application apparatus has been detected.

SUMMARY OF THE INVENTION

According to a first aspect of the present invention, an image forming system includes an image forming apparatus configured to form an image on a recording material, a varnish application apparatus configured to apply varnish to the recording material on which an image is formed by the image forming apparatus, and a controller configured to execute a first image forming job in which varnish is applied by the varnish application apparatus to a recording material on which an image is formed by the image forming apparatus and a second image forming job in which vanish is not applied by the varnish application apparatus to a recording material on which an image has been formed by the image forming apparatus. The varnish application apparatus includes a varnish application unit configured to apply varnish to a recording material, a first conveyance unit configured to convey a recording material in a first conveyance path that passes through the varnish application unit, and a second conveyance unit configured to convey a recording material in a second conveyance path that does not pass through the varnish application unit. In a case where failure is occurred to one or both of the varnish application unit and the first conveyance unit and failure is not occurred to the second conveyance unit, the controller is configured to permit execution of the second image forming job and to convey a recording material by the second conveyance unit in the varnish application apparatus.

According to a second aspect of the present invention, an image forming system includes an image forming apparatus configured to form an image on a recording material, a varnish application apparatus configured to apply varnish to the recording material on which an image is formed by the image forming apparatus, and a controller configured to execute a first image forming job in which varnish is applied by the varnish application apparatus to a recording material on which an image is formed by the image forming apparatus and a second image forming job in which varnish is not applied by the varnish application apparatus to a recording material on which an image is formed by the image forming apparatus. The varnish application apparatus includes a varnish application unit configured to apply varnish to a recording material, a first conveyance unit configured to convey a recording material in a first conveyance path that passes through the varnish application unit, and a second conveyance unit configured to convey a recording material in a second conveyance path that does not pass through the varnish application unit. In a case where failure is occurred to the second conveyance unit and failure is not occurred to the varnish application unit and the first conveyance unit, the controller is configured to permit execution of the first image forming job and to convey a recording material by the first conveyance unit in the varnish application apparatus.

Further features of the present invention will become apparent from the following description of exemplary embodiments with reference to the attached drawings.

DESCRIPTION OF THE EMBODIMENTS

First Embodiment

Image Forming Apparatus

Figure 1:
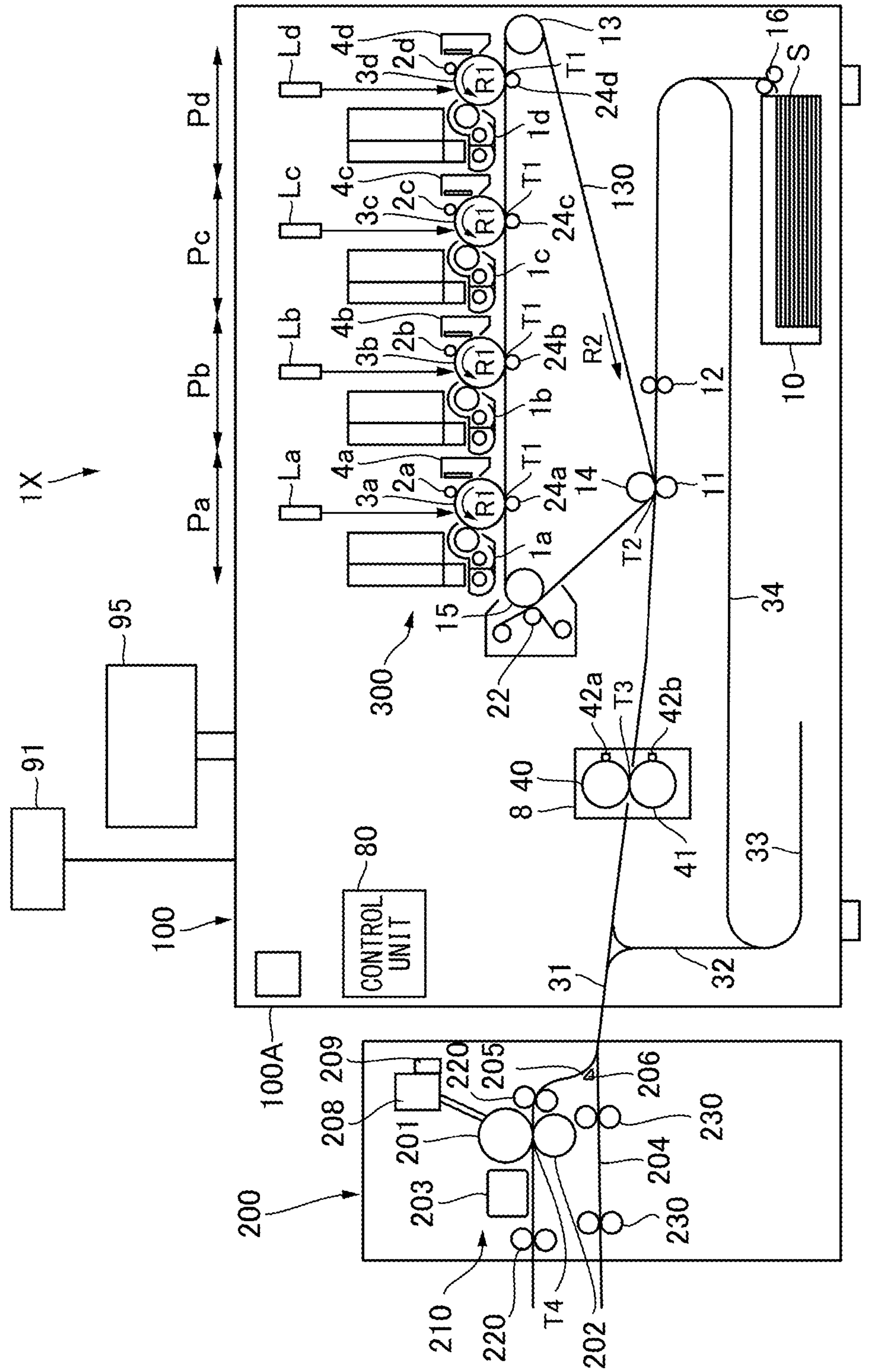
FIG. 1 is a schematic view illustrating an image forming system according to a present embodiment.

An image forming system according to the present embodiment will be described with reference to FIG. 1. An image forming system 1X according to the present embodiment includes an image forming apparatus 100 for forming a toner image on a recording material S and a varnish application apparatus (varnish coater) 200 connected to the image forming apparatus 100 for applying varnish and performing surface processing to the recording material S on which the toner image has been fixed by the image forming apparatus 100. The image forming system 1X is equipped with a main power switch not shown, and by power supplied from an external power supply or an internal power supply in response to turning on of power of the main power switch, the image forming apparatus 100 and the varnish coater 200 are respectively started from a stopped state.

The image forming apparatus 100 is a tandem-type full-color printer adopting an electrophotographic system. The image forming apparatus 100 includes image forming units Pa, Pb, Pc, and Pd respectively forming color images of yellow, magenta, cyan, and black. The image forming apparatus 100 forms a toner image on the recording material S based on an image signal from a document reading apparatus (not shown) connected to the apparatus body 100A or an external apparatus 91 such as a personal computer that is connected to the apparatus body 100A in a manner capable of communicating signals therewith.

According to the present embodiment, an image forming unit 300 for forming a toner image on a recording material S is composed of image forming units Pa to Pd, primary transfer rollers 24*a* to 24*d*, an intermediate transfer belt 130, a plurality of rollers 13 to 15, and a secondary transfer outer roller 11. Further, various types of sheet materials, such as paper material including plain paper, thick paper, rough paper, uneven paper, and coated paper, plastic films, and cloth, can be used as the recording material S.

As illustrated in FIG. 1, the image forming units Pa, Pb, Pc, and Pd are aligned along a direction of movement of the intermediate transfer belt 130 within the apparatus body 100A. The intermediate transfer belt 130 is stretched across the plurality of rollers (13, 14, and 15) and configured to rotate in a direction of arrow R2. The intermediate transfer belt 130 is configured to bear and convey a toner image that has been primarily transferred thereto. The secondary transfer outer roller 11 is arranged at a position opposed to a secondary transfer inner roller 14 supporting and stretching the intermediate transfer belt 130 with the intermediate transfer belt 130 interposed therebetween, and constitutes a secondary transfer portion T2 where the toner image on the intermediate transfer belt 130 is transferred to the recording material S. A fixing apparatus 8, serving as a fixing unit, is arranged downstream in a recording material conveyance direction of the secondary transfer portion T2.

A cassette 10 storing the recording material S is arranged in a lower part of the image forming apparatus 100. The recording material S is conveyed by a conveyance roller 16 from the cassette 10 toward a registration roller 12. Thereafter, the registration roller 12 is started to be rotated in synchronization with the toner image formed on the intermediate transfer belt 130 as described below, by which the recording material S is conveyed to the secondary transfer portion T2. Only one cassette 10 is illustrated, but a plurality of cassettes 10 capable of storing different types of recording materials S having various sizes and thicknesses can be provided, in which case the recording material S is conveyed selectively from one of the plurality of cassettes 10. Further, not only the recording material S stored in the cassette 10 but also the recording material S supported on a manual sheet feed portion (not shown) can be conveyed.

The four image forming units Pa, Pb, Pc, and Pd arranged in the image forming apparatus 100 have substantially the same configuration except for the difference in the colors being developed. In the following description, an image forming unit Pa for developing a yellow image is described as an example, and the descriptions of other image forming units Pb. Pc, and Pd are omitted.

A cylindrical photosensitive drum 3*a* serving as a photosensitive member is arranged in the image forming unit Pa. The photosensitive drum 3*a* is driven to rotate in an arrow R1 direction. A charging unit 2*a*, an exposing unit La, a developing unit 1*a*, a primary transfer roller 24*a*, and a drum cleaning device 4*a* are arranged in a circumference of the photosensitive drum 3*a*.

A process for forming a full-color image by the image forming apparatus 100 will be described as an example. At first, in a state where an image forming operation is started, a surface of the rotating photosensitive drum 3*a* is charged uniformly by the charging unit 2*a* The charging unit 2*a* is, for example, a corona charger that irradiates charged particles by corona discharge to charge the photosensitive drum 3*a* to a uniform negative dark potential. Next, the photosensitive drum 3*a* is scanned and exposed by laser light emitted from the exposing unit La corresponding to image signals. Thereby, an electrostatic latent image corresponding to image signals is formed on the photosensitive drum 3*a*. The electrostatic latent image formed on the photosensitive drum 3*a* is developed as a toner image, which is a visible image, using developer containing toner and carrier stored in the developing unit 1*a*. According to the present embodiment, the developing units 1*a* to 1*d* respectively use two-component developer containing nonmagnetic toner and magnetic carrier. Toner having a low melting point and containing binding resin, coloring agent, and wax as a releasing agent is used.

The toner image formed on the photosensitive drum 3*a* is primarily transferred to the intermediate transfer belt 130 at a primary transfer portion T1 formed between the intermediate transfer belt 130 and the primary transfer roller 24*a* arranged in a manner interposing the intermediate transfer belt 130. In this state, a primary transfer voltage is applied to the primary transfer roller 24*a* The toner remaining on the surface of the photosensitive drum 3*a* after primary transfer is removed by the drum cleaning device 4*a*.

The above-described operation is performed sequentially in each of the image forming units Pa to Pd corresponding to yellow, magenta, cyan, and black, and the toner images of four colors are superposed on the intermediate transfer belt 130. Thereafter, at a matched timing with the formation of toner images, the recording material S stored in the cassette 10 is conveyed to the secondary transfer portion T2. Then, by applying a secondary transfer voltage to the secondary transfer outer roller 11, a full-color toner image formed on the intermediate transfer belt 130 is collectively secondarily transferred to the recording material S. The toner remaining on the intermediate transfer belt 130 after secondary transfer is removed by a belt cleaning device 22.

Next, the recording material S to which the toner image has been transferred is conveyed to the fixing apparatus 8. In the fixing apparatus 8, the recording material S bearing the toner image is nipped and conveyed at a fixing nip portion T3 composed of a fixing belt 40 and a pressing belt 41, and heat and pressure is applied to the recording material S. The toner of the toner image borne on the recording material S is melted and mixed by the heat and pressure applied in this manner, and the toner image is fixed on the recording material S as a full-color image. A series of image forming processes is completed in this manner.

Varnish Coater

The image forming system 1X according to the present embodiment includes the image forming apparatus 100 and the varnish coater 200 connected thereto so as to enable an image forming process of forming a toner image on the recording material S by the image forming apparatus 100 and a varnish coating process of applying varnish by the varnish coater 200 to be processed consecutively. In other words, the image forming system 1X is an in-line system capable of automatically conveying the recording material S on which the toner image has been formed from the image forming apparatus 100 to the varnish coater 200 to thereby consistently perform the image forming process and the varnish coating process to the recording material S when an image forming job is entered.

The varnish coater 200 is configured connectably to the image forming apparatus 100 as one of peripheral devices, also referred to as optional units, that can be retrofitted to the image forming apparatus 100 to expand the functions thereof. The varnish coater 200 is capable of applying varnish as surface processing to the recording material S discharged from the apparatus body 100A with the aim to apply glossiness and provide surface protection as added value to the recording material S, for example. The varnish coater 200 is, for example, an apparatus having a maximum sheet passing size of 330 mm×482 mm, an applicable varnish thickness, i.e., coating thickness, of 6 to 14 μm, and a maximum conveyance speed of the recording material S of 35 m/min.

Next, the varnish coater 200 will be described. An example of using an ultraviolet-curing type UV varnish, which is a varnish cured by ultraviolet radiation is described. As illustrated in FIG. 1, the varnish coater 200 includes a varnish storage tank 208, serving as a tank, that stores varnish liquid or varnish, a heater 209 that heats varnish liquid stored in the varnish storage tank 208, and a varnish application unit 210 that applies varnish to the recording material S by receiving varnish supply from the varnish storage tank 208. The varnish application unit 210 includes a varnish application roller 201 and a counter roller 202 serving as an application unit for forming a varnish application nip portion T4 for applying varnish on the recording material S, and an ultraviolet radiation lamp 203 serving as an irradiation unit for curing varnish applied to the recording material S. Further, although not shown, the varnish application unit 210 includes a pressurization mechanism that urges the varnish application roller 201 and the counter roller 202 toward each other, and a supplying mechanism that supplies varnish from the varnish storage tank 208 serving as a storage container to the varnish application roller 201.

The varnish application roller 201 is formed to have a dimension capable of applying varnish supplied from the varnish storage tank 208 across the entire area of the recording material S in a longitudinal width direction that is orthogonal to the conveyance direction. The ultraviolet radiation lamp 203 irradiates the recording material S on which varnish is applied by the varnish application roller 201 with UV light having a wavelength corresponding to varnish, to thereby cure the varnish. The ultraviolet radiation lamp 203 is disposed to irradiate ultraviolet radiation, i.e. UV light, to approximately the entire area of the recording material S in the longitudinal width direction, similar to the varnish application roller 201.

Further, the varnish coater 200 includes a first conveyance unit 220 and a second conveyance unit 225 for conveying the recording material S. The interior of the varnish coater 200 is divided into a varnish application route 205 (a first conveyance path) through which the recording material S is conveyed through the varnish application unit 210, and a varnish bypath route 204 (a second conveyance path) through which the recording material S is conveyed without passing through the varnish application unit 210. A switching unit 206 is provided to switch the conveyance path of the recording material S between the varnish application route 205 and the varnish bypath route 204. In a case where the path is switched to the varnish application route 205 by the switching unit 206, the recording material S is conveyed to the varnish application unit 210 by the first conveyance unit 220, such that varnish is applied to the recording material S before the recording material S is discharged. Meanwhile, in a case where the path is switched to the varnish bypath route 204 by the switching unit 206, the recording material S will not be conveyed to the varnish application unit 210 by the second conveyance unit 225, such that the recording material S will be discharged without having varnish applied thereto.

The application unit for applying varnish to the recording material S is not limited to the use of a roller method using the varnish application roller 201 and the counter roller 202, and the use of an inkjet method using line heads is also possible. When using line heads, the varnish is not only applied to the entire surface of the recording material S but also used to form a varnish image such as characters and figures on an arbitrary position on the recording material S. Further, a UV-curing type varnish is illustrated as an example of varnish, but other types of varnish such as oil varnish and aqueous varnish can also be used. However, when oil varnish or aqueous varnish is used, infrared (IR) lamp is preferably used as a drying unit for drying the varnish, instead of using the ultraviolet radiation lamp 203. Further, varnish can be dried by hot air, or varnish can be dried using both the IR lamp and hot air.

Control Unit

As illustrated in FIG. 1, the image forming apparatus 100 includes a control unit 80, which is an example of a controller. The control unit 80 will be described based on FIG. 2 with reference to FIG. 1. Various devices such as motors and power supplies for operating the image forming apparatus 100 are connected to the control unit 80 other than those illustrated in the drawings, but since they are not the main object of the present technique, they are not shown and descriptions thereof are omitted.

The control unit 80 performs various controls such as the image forming operation of the image forming apparatus 100. The control unit 80 includes a Central Processing Unit (CPU) 81, a Random Access Memory (RAM) 82, and a Read Only Memory (ROM) 83. The ROM 83 stores various programs and various data, such as an image forming job or a varnish coater failure processing (refer to FIG. 3). The CPU 81 is capable of executing various programs stored in the ROM 83 and controlling each of the image forming apparatus 100 and the varnish coater 200 as the image forming system 1X. The RAM 82 stores operation data and input data. The RAM 82 can also temporarily store computation processing results accompanying the execution of various programs.

The CPU 81 has, in addition to the RAM 82 and the ROM 83, an input/output interface unit (I/F unit) 85, a varnish application apparatus control unit 86, an input reception unit 87, a temperature detection unit 88, and a motor control unit 90 connected thereto via a bus 84. An operation unit 95 is connected to the input/output interface unit (I/F unit) 85. The operation unit 95 includes an input unit 93 and a display unit 94, wherein the input unit 93 is an operation panel and the like through which instructions to execute various programs such as the image forming job or input of various data by the user are received. The display unit 94 is, for example, a liquid crystal monitor on which various screens including a varnish coater stop screen (refer to FIG. 4A described below) and a menu screen presenting various executable programs can be displayed.

According to the present embodiment, the user can enter through the input unit 93 an instruction to start a first image forming job in which varnish application is performed after image formation and a second image forming job in which varnish application is not performed after image formation, together with information on whether to perform color printing or monochrome printing and the type of the recording material S to be used. Further, the user can enter an instruction to stop the heater 209 through the input unit 93. It is possible to display a virtual operator that resembles switches of the operation unit 95 on the display unit 94, and to enable the user to enter execution operations of various programs and input operations of various data through use of the virtual operator In other words, the operation unit 95 can be a so-called touch panel. Further, the operation unit 95 can also serve as a display unit of the external apparatus 91, such as a personal computer connected via a wired or wireless communication network.

The CPU 81 can acquire image data and various data from the external apparatus 91 such as a personal computer via the input reception unit 87. Further, according to the present embodiment, an instruction to start the first image forming job in which varnish application is performed after image formation and the second image forming job in which varnish application is not performed after image formation can be acquired from the external apparatus 91.

The temperature detection unit 88 detects the temperatures of the fixing roller 40 and the pressing roller 41 based on detection results of thermistors 42*a* and 42*b*. The CPU 81 controls a heater control unit 89 based on a temperature detected by the temperature detection unit 88. The heater control unit 89 controls a heater 40*a* for heating the fixing roller 40 and a heater 41*a* for heating the pressing roller 41 such that the temperatures of the fixing roller 40 and the pressing roller 41 become the target temperatures. According to the present embodiment, the CPU 81 can control the heater 40*a* by the heater control unit 89 such that the surface temperature of the fixing roller 40 is set to a desirable temperature within the range of 140 to 190° C., for example, as a target temperature capable of fixing the toner image to the recording material S. The target temperature of the fixing roller 40 is set to a predetermined temperature according to a grammage of the recording material S to realize both fixity of toner to the recording material S and glossiness of the toner image after fixing. Meanwhile, the CPU 81 can control the heater 41*a* by the heater control unit 89 such that the surface temperature of the pressing roller 41 is maintained to 100° C., for example.

The motor control unit 90 controls the rotation of a motor 92. The CPU 81 controls a rotational speed of the fixing roller 40 via the motor control unit 90 to thereby control a conveyance speed of the recording material S at the fixing apparatus 8 during fixing of toner image.

The varnish application apparatus control unit 86 controls the varnish coater 200 connected to the image forming apparatus 100. For example, the varnish application apparatus control unit 86 controls the varnish application unit 210, the first conveyance unit 220, and the second conveyance unit 230. The CPU 81 controls the varnish coater 200 by transmitting and receiving electric signals via the bus 84. Therefore, if transmission and reception of electric signals via the bus 84 between the image forming apparatus 100 and the varnish coater 200 is not possible, the CPU 81 determines that the image forming apparatus 100 and the varnish coater 200 are not connected.

Failure Processing

Figure 2:
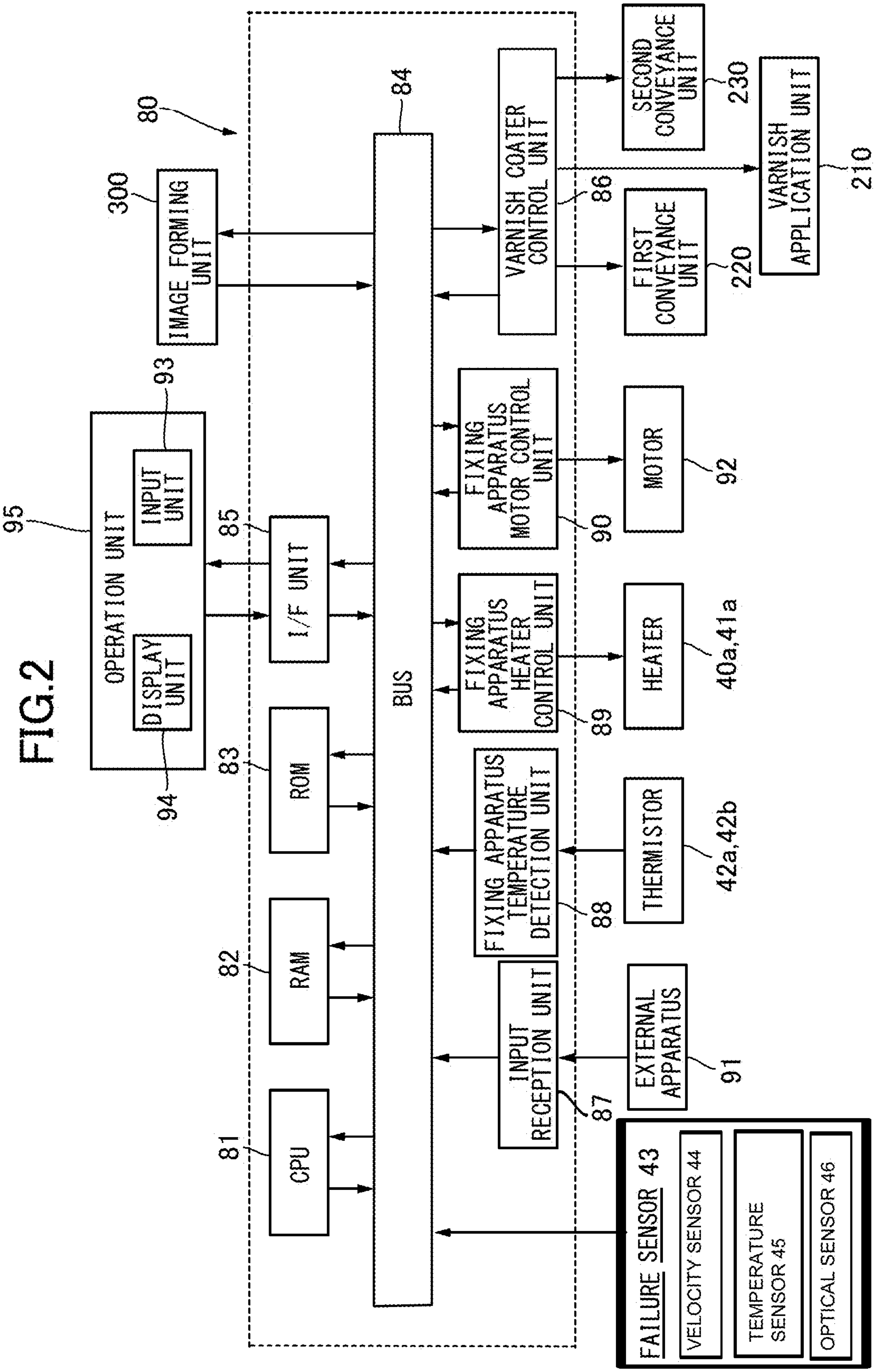
FIG. 2 is a control block diagram illustrating a control unit.

Next, the varnish coater failure processing according to the present embodiment will be described based on FIGS. 3 to 4B with reference to FIGS. 1 and 2. The varnish coater failure processing illustrated here is started by the control unit 80 in response to the input of an image forming job.

Figure 3:
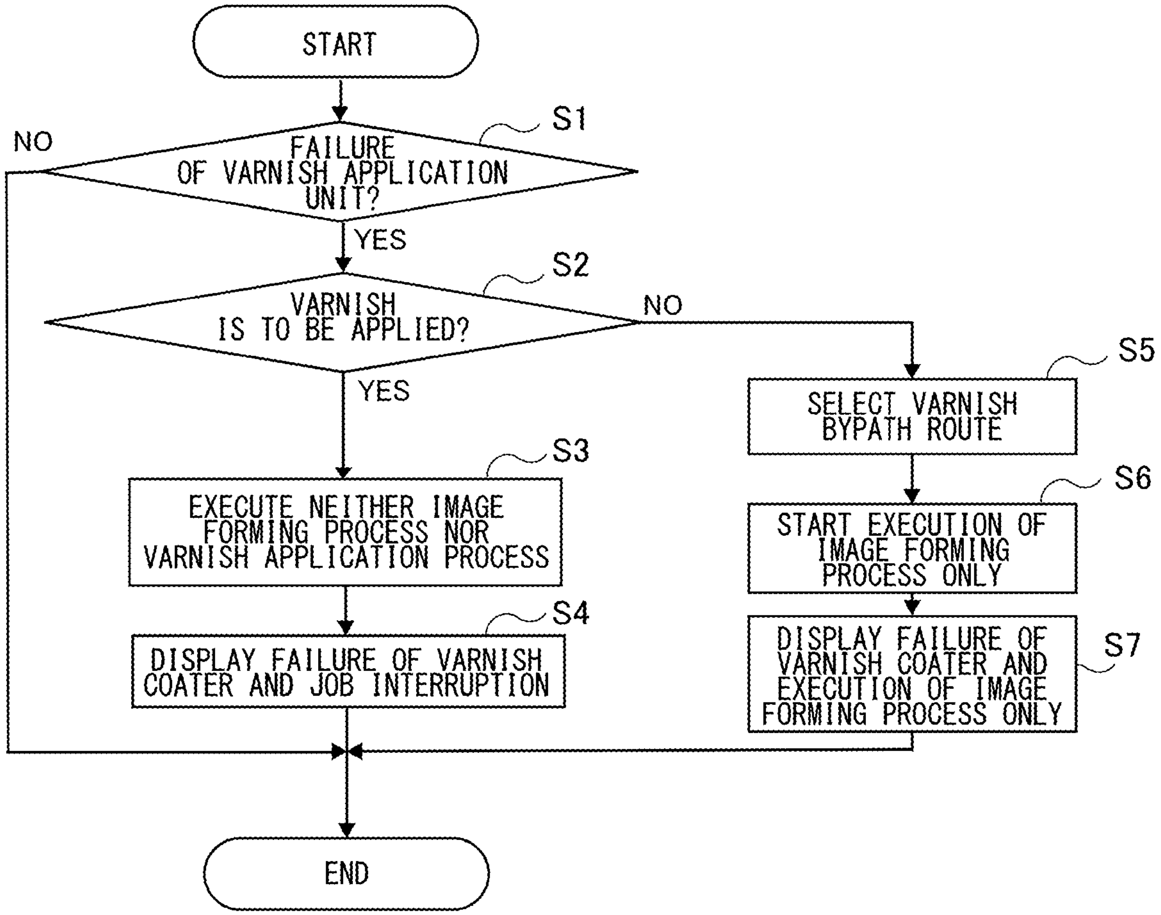
FIG. 3 is a flowchart illustrating a varnish coater failure processing according to a first embodiment.

As illustrated in FIG. 3, the control unit 80 determines whether failure of the varnish application unit 210 has occurred (S1). Failure of the varnish application unit 210 means, for example, breakage of the varnish application roller 201, insufficient heating of varnish liquid by the heater 209, and burnout of the ultraviolet radiation lamp 203, which lead to failure of the component that causes a state where the varnish application process cannot be performed correctly. Whether failure of the varnish application unit 210 has occurred can be determined, for example, based on whether the values detected by various sensors, such as a velocity sensor 44 that measures rotation of the varnish application roller 201, a temperature sensor 45 that measures a temperature of varnish liquid inside the varnish storage tank 208, and an optical sensor 46 that detects the amount of light of the ultraviolet radiation lamp 203, have reached a desirable value. In the present embodiment, these sensors are collectively referred to as a failure sensor 43 (refer to FIG. 2) connected to the control unit 80.

In the present embodiment, the control unit 80 determines whether failure has occurred to the varnish application unit 210 in S1, but it is also possible to have the control unit 80 determine whether failure has occurred to at least one of the varnish application unit 210 and the first conveyance unit 220. The processes that follow are similar for both cases where the control unit 80 determines whether failure has occurred to the varnish application unit 210 and determines whether failure has occurred to at least one of the varnish application unit 210 and the first conveyance unit 220, such that in the present embodiment, the case where the control unit 80 determines whether failure has occurred to the varnish application unit 210 will be described.

In a state where failure has not occurred to the varnish application unit 210 (S1: No), the control unit 80 ends the processing. In this case, although not shown, if a second image forming job is entered, the control unit 80 executes an image forming process by the image forming apparatus 100, and simply forms a toner image on the recording material S without performing varnish application thereto. That is, the control unit 80 permits execution of the second image forming job. In this state, the control unit 80 causes the recording material S to be conveyed through the varnish bypath route 204 by the second conveyance unit 230 in the varnish coater 200, and will not perform varnish application. Meanwhile, if a first image forming job is entered, the control unit 80 executes the image forming process by the image forming apparatus 100 and the varnish application process by the varnish coater 200, and forms a toner image on the recording material S and also applies varnish thereto. That is, the control unit 80 permits execution of the first image forming job. In this state, the control unit 80 causes the recording material S to be conveyed through the varnish application route 205 by the first conveyance unit 220 in the varnish coater 200, and performs varnish application.

In a case where failure of the varnish application unit 210 has occurred (S1: Yes), the control unit 80 determines whether the image forming job is a first image forming job in which varnish application is performed after image formation (S2). If the job is a first image forming job (S2: Yes), the control unit 80 will not permit execution of the first image forming job and will execute neither the image forming process by the image forming apparatus 100 nor the varnish application process by the varnish coater 200 (S3). That is, if the job is a first image forming job in which varnish application is performed, the image forming process as a previous process thereof will not be performed by the image forming apparatus 100, such that the recording material S will not be conveyed from the image forming apparatus 100 to the vanish coater 200 that has failed. Then, the control unit 80 outputs a notice to the user by displaying a varnish coater failure and job interruption screen (refer to FIG. 4A) on the display unit 94 (S4). If the control unit 80 determines that failure has occurred to at least one of the varnish application unit 210 and the first conveyance unit 220, it may be possible to display a notice that failure has occurred to the first conveyance unit 220 on the display unit 94.

Meanwhile, in a case where the job is a second image forming job in which varnish application is not performed after image formation (S2: No), the control unit 80 performs switching to the varnish bypath route 204 by the switching unit 206 (S5). Then, the control unit 80 permits execution of the second image forming job, and executes the image forming process by the image forming apparatus 100 (S6). In this case, the recording material S on which the toner image has been formed is conveyed from the image forming apparatus 100 to the varnish coater 200, and conveyed through the varnish bypath route 204 by the second conveyance unit 230 in the varnish coater 200. That is, in a state where the job is a second image forming job in which varnish application is not performed, even if the recording material S is conveyed to the varnish coater 200 from the image forming apparatus 100, the recording material S is conveyed through the varnish bypath route 204 that does not pass through the varnish application unit 210. Therefore, in the case of the second image forming job, the image forming process by the image forming apparatus 100 will be performed even if failure has occurred to the varnish application unit 210. Then, the control unit 80 notifies the user by displaying a varnish coater failure screen (refer to FIG. 4B) on the display unit 94 (S7).

Figure 4A:
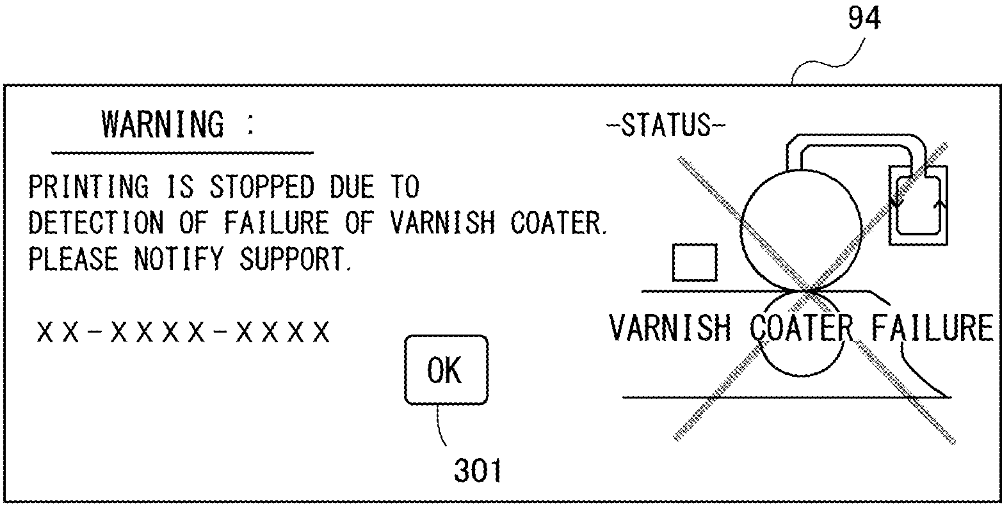
FIG. 4A is a view illustrating a varnish coater failure and job interruption screen.

FIG. 4A illustrates a varnish coater failure and job interruption screen. As illustrated in FIG. 4A, the varnish coater failure and job interruption screen displays that failure has occurred to the varnish coater 200 and that the first image forming job has been interrupted thereby. That is, the varnish coater failure and job interruption screen is displayed on the display unit 94 to notify the user that the first image forming job will not be executed due to failure of the varnish coater 200 and to urge the user to repair the varnish coater 200. The user presses an OK button 301 after confirming the message.

Figure 4B:
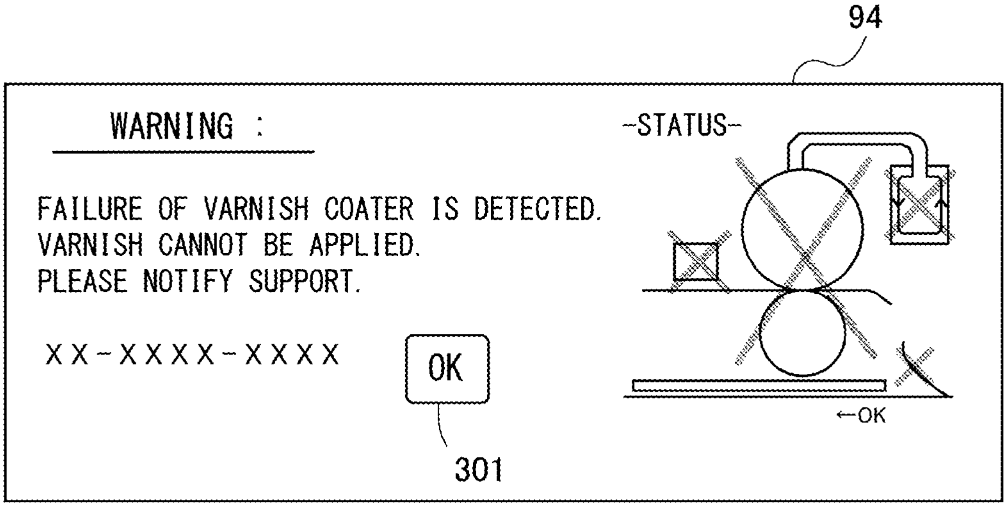
FIG. 4B is a view illustrating a varnish coater failure screen.

FIG. 4B illustrates a varnish coater failure screen. As illustrated in FIG. 4B, the varnish coater failure screen displays that failure has occurred to the vanish coater 200 and that varnish cannot be applied due to the failure of the varnish coater 200. The user presses the OK button 301 after confirming the message. As described, according to the present embodiment, the second image forming job will be executed even if failure of the varnish coater 200 has occurred, such that the user can acquire the recording material S on which the desired toner image is formed. On the varnish coater failure screen, a notice that failure has not occurred to the second conveyance unit 230 is displayed, such as by displaying OK, such that the user is notified that the second image forming job in which toner image is formed on the recording material S without applying varnish thereto can be executed.

Since the second image forming job is executed even if failure has occurred to the varnish coater 200, if failure of the varnish coater 200 is not notified to the user, there may be a possibility that the user will recognize that failure has occurred to the varnish coater 200 only when the user attempts to perform the first image forming job. In that case, the first image forming job cannot be executed until the repairment of the varnish coater 200 is completed, and the user will not be able to obtain the recording material S subjected to varnish application, such that the operation efficiency of the image forming system 1X is deteriorated. Therefore, the user is urged to repair the vanish coater 200 by being notified that failure of the varnish coater 200 has occurred even if the second image forming job is executed and a desired recording material S can be acquired.

As described, according to the present embodiment, even if failure has occurred to the varnish application unit 210, if failure of the second conveyance unit 230 has not occurred, execution of the second image forming job is permitted. If the job is a second image forming job that does not execute varnish application, the recording material S conveyed from the image forming apparatus 100 is conveyed by the second conveyance unit 230 in the varnish coater 200. That is, the recording material S will be conveyed through the varnish bypath route 204 by the second conveyance unit 230, and will not pass through the varnish application unit 210. In other words, since the recording material S will not pass through the varnish application unit 210 that has failed, such that even if failure has occurred to the varnish application unit 210, the recording material S on which image has been formed by the image forming apparatus 100 can be passed through. As descried, by conveying the recording material S using the second conveyance unit 230 that has not failed, the user can perform the image forming process by the image forming apparatus 100 even if failure has occurred to the varnish application unit 210, such that the operation efficiency of the image forming system is improved.

Second Embodiment

Figure 5:
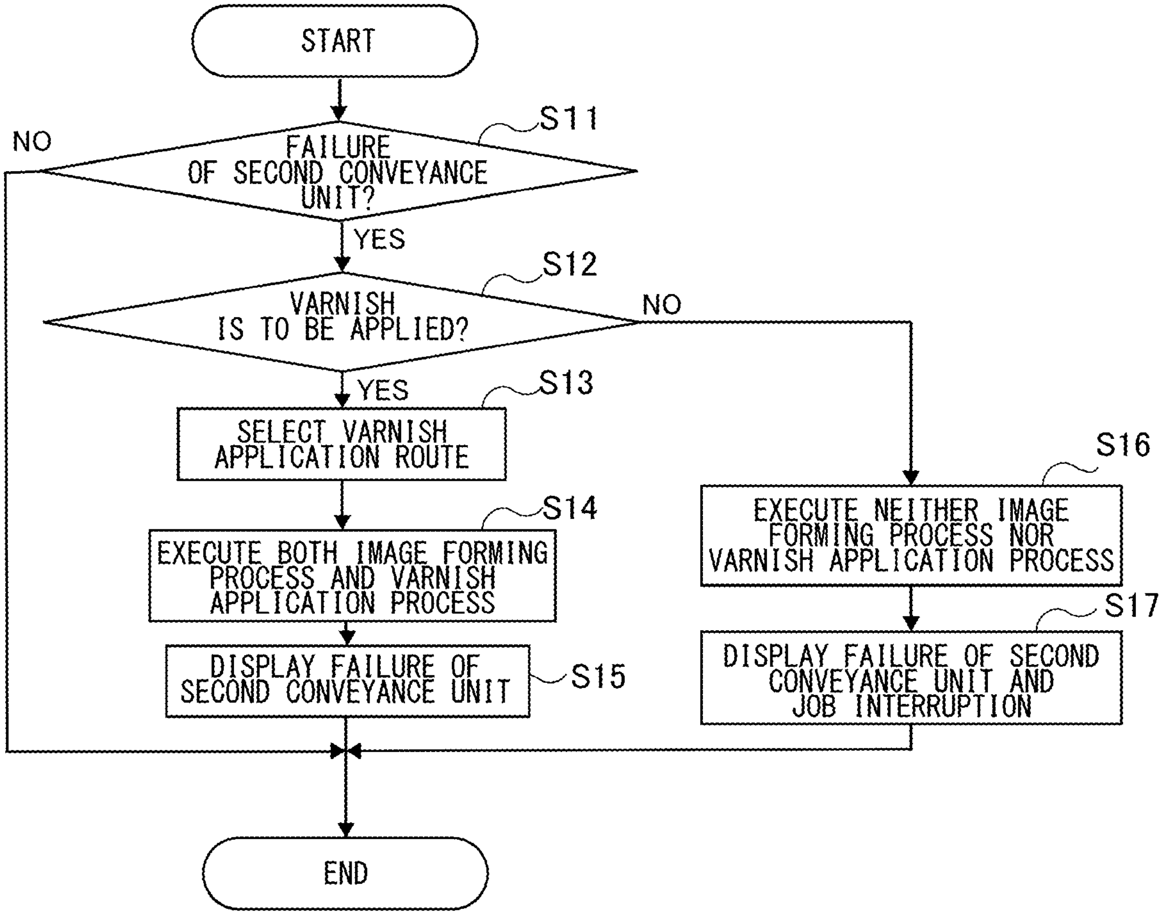
FIG. 5 is a flowchart illustrating a varnish coater failure processing according to a second embodiment.

Next, a varnish coater failure processing according to a second embodiment will be described based on FIGS. 5 to 6B with reference to FIGS. 1 and 2. As illustrated in FIG. 5, the control unit 80 determines whether failure has occurred to the second conveyance unit 230 (S11). Whether failure has occurred to the second conveyance unit 230 can be determined, for example, by detecting the rotation of the roller or the state of operation of the motor included in the second conveyance unit 230 using the failure sensor 43 (refer to FIG. 2).

If failure has not occurred to the second conveyance unit 230 (S11: No), the control unit 80 ends the processing. In this case, similar to the first embodiment described above, if a second image forming job is entered, the control unit 80 executes the image forming process by the image forming apparatus 100, and if a first image forming job is entered, the control unit 80 executes the image forming process by the image forming apparatus 100 and the varnish application process by the varnish coater 200.

If failure has occurred to the second conveyance unit 230 (S11: Yes), the control unit 80 determines whether the image forming job is a first image forming job in which varnish application is performed after image formation (S12). If the job is a first image forming job (S12: Yes), the control unit

80 performs switching to the varnish application route 205 by the switching unit 206 (S13). Then, the control unit 80 permits execution of the first image forming job and executes the image forming process by the image forming apparatus 100 and the varnish application process by the varnish coater 200 (S14). In that case, the recording material S on which the toner image has been formed is conveyed from the image forming apparatus 100 to the varnish coater 200, and in the varnish coater 200, conveyed through the varnish application route 205 by the first conveyance unit 220. That is, if the job is a first image forming job in which vanish application is performed, the recording material S is conveyed by the first conveyance unit 220 instead of being conveyed by the second conveyance unit 230. Therefore, even if failure has occurred to the second conveyance unit 230, the recording material S can be conveyed through the varnish coater 200 by the first conveyance unit 220 that has not failed. Therefore, in the case of a first image forming job, even if failure has occurred to the second conveyance unit 230, the image forming process by the image forming apparatus 100 and the varnish application process by the varnish coater 200 can be performed. Then, the control unit 80 outputs a notice to the user by displaying a second conveyance unit failure screen (refer to FIG. 6A) on the display unit 94 (S15). The user presses the OK button 301 after confirming the message.

Meanwhile, if the job is a second image forming job in which varnish application is not performed (S12: No), the control unit 80 will not permit execution of the second image forming job and will execute neither the image forming process by the image forming apparatus 100 nor the varnish application process by the varnish coater 200 (S16). That is, if the job is a second image forming job in which varnish application is not performed, the recording material S is conveyed by the second conveyance unit 230 in the varnish coater 200. Therefore, the recording material S cannot be conveyed if failure has occurred to the second conveyance unit 230, such that execution of the second image forming job using the second conveyance unit 230 will not be permitted. In contrast, if the job is a first image forming job in which varnish application is performed, the recording material S is conveyed by the first conveyance unit 220 in the varnish coater 200, and the second conveyance unit 230 is not used. Therefore, even if failure has occurred to the second conveyance unit 230, the recording material S can still be conveyed by the first conveyance unit 220, such that the execution of the first image forming job using the first conveyance unit 220 is permitted. In that case, the control unit 80 notifies the user by displaying a second conveyance unit failure and job interruption screen (refer to FIG. 6B) on the display unit 94 (S17). The user presses the OK button 301 after confirming the message.

Figure 6A:
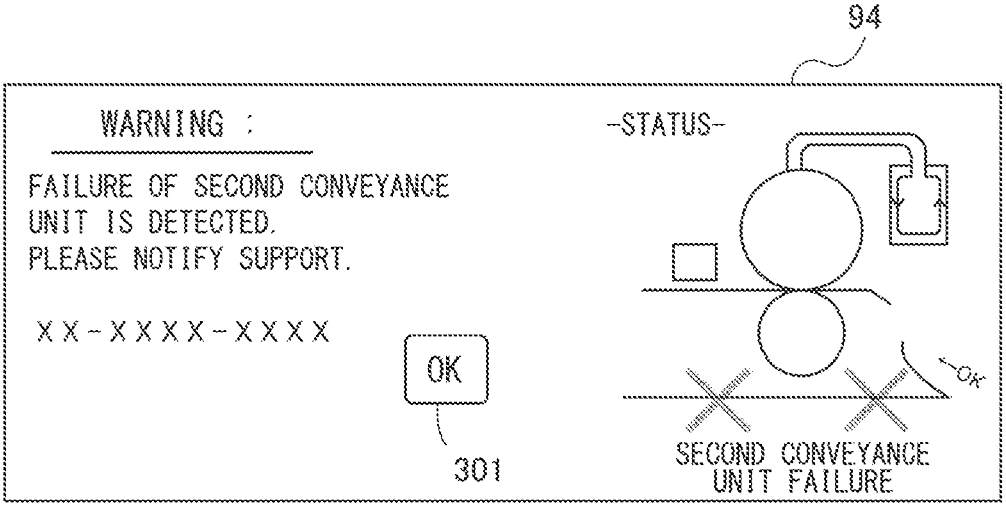
FIG. 6A is a view illustrating a second conveyance unit failure screen.
Figure 6B:
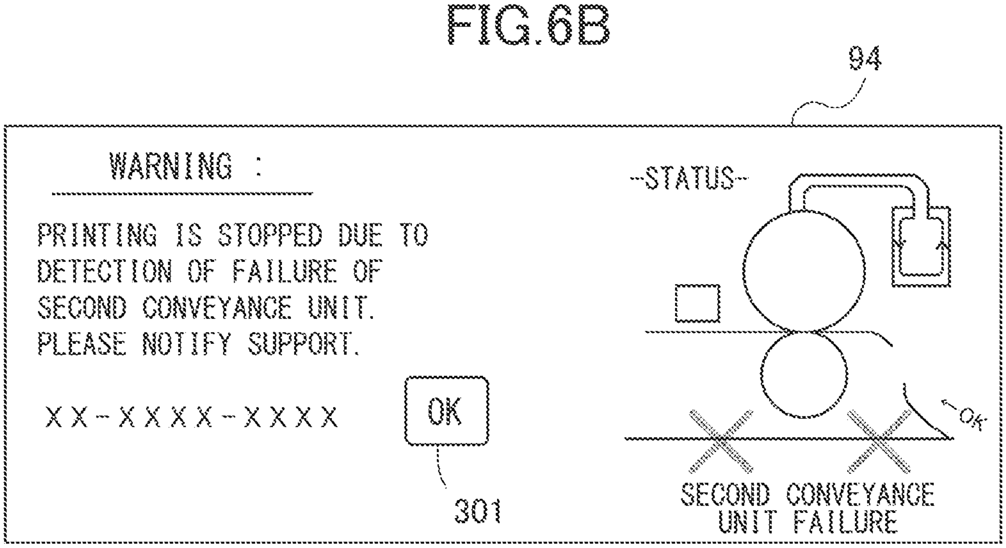
FIG. 6B is a view illustrating a second conveyance unit failure and job interruption screen.

FIG. 6A illustrates a second conveyance unit failure screen, and FIG. 6B illustrates a second conveyance unit failure and job interruption screen. As illustrated in FIG. 6A, the second conveyance unit failure screen displays that failure has occurred to the second conveyance unit 230. As described, according to the present embodiment, the first image forming job is executed even if failure has occurred to the second conveyance unit 230, such that the user can acquire the recording material S on which a desired toner image is formed and varnish is applied. However, if the user is not notified of the failure of the second conveyance unit 230, there is a possibility that the user recognizes that failure has occurred to the second conveyance unit 230 only after the user enters a second image forming job, according to which the operation efficiency of the image forming system 1X is deteriorated. Therefore, even if the user is capable of acquiring the desired recording material S, the failure of the second conveyance unit 230 is still notified to urge the user to take appropriate actions.

As illustrated in FIG. 6B, a notice informing that failure has occurred to the second conveyance unit 230 and that the second image forming job is interrupted thereby is displayed on the second conveyance unit failure and job interruption screen. That is, the second conveyance unit failure and job interruption screen is displayed on the display unit 94 to notify the user that the second image forming job is not executed due to the failure of the second conveyance unit 230.

As described, according to the present embodiment, in a state where failure has occurred to the second conveyance unit 230, the execution of the first image forming job is permitted Since according to the second image forming job in ich varnish application is not performed, the recording material S is conveyed using the second conveyance unit 230, such that the recording material S cannot be conveyed by the second conveyance unit 230 that has failed, so the execution of the second image forming job is not permitted. In contrast, in the case of a first image forming job in which varnish application is performed, the recording material S is conveyed using the first conveyance unit 220, and the recording material S will not be conveyed using the second conveyance unit 230 that has failed. Therefore, in the case of the first image forming job, the recording material S can be conveyed using the first conveyance unit 220 that has not failed and have varnish applied by the varnish coater 200, such that execution is permitted. Thereby, the operation efficiency of the image forming system is improved.

The embodiment described above is not limited to application to an electrophotographic image forming apparatus in which the toner image is formed on the recording material using a two-component developer containing toner and carrier, and it is applicable to other types of image forming apparatuses. For example, it is applicable to an inkjet-type image forming apparatus in which image is formed by discharging ink onto the recording material.

According to the present invention, deterioration of productivity of the image forming system in a case where failure has occurred to the varnish application apparatus can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-173230, filed Oct. 22, 2021, which is hereby incorporated by reference herein in its entirety.

What is claimed is:

1. An image forming system comprising:

an image forming apparatus configured to form an image on a recording material;

a varnish application apparatus configured to apply varnish to the recording material on which an image is formed by the image forming apparatus;

a failure sensor unit;

a controller configured to execute a first type of image forming job in which varnish is applied by the varnish application apparatus to a recording material on which an image is formed by the image forming apparatus and a second type of image forming job in which varnish is not applied by the varnish application apparatus to a recording material on which an image has been formed by the image forming apparatus; and a display unit, wherein the varnish application apparatus comprises:

a varnish storage tank configured to store varnish;

a varnish application unit configured to apply varnish to a recording material by receiving varnish from the varnish storage tank;

a first conveyance unit configured to convey a recording material in a first conveyance path that passes through the varnish application unit; and a second conveyance unit configured to convey a recording material in a second conveyance path that does not pass through the varnish application unit, wherein the varnish application unit includes a varnish application roller configured to apply varnish on the recording material and an ultraviolet radiation lamp configured to cure varnish applied to the recording material, wherein the failure sensor unit includes a velocity sensor configured to measure rotation of the varnish application roller, a temperature sensor configured to measure a temperature of varnish in the varnish storage tank, and an optical sensor configured to detect the amount of light of the ultraviolet radiation lamp, and wherein, the controller is configured to determine whether a failure has occurred in the varnish application unit based on a detection result of the failure sensor unit, and in a case where the controller determines that a failure has occurred in the varnish application unit, the controller determines whether the controller receives the first type of image forming job or the second type of image forming job, and controls the image forming system so that in a case where the controller receives the first type of image forming job, the controller does not permit the image forming apparatus to form an image on a recording material and causes the display unit to display an error message that a failure has occurred in the varnish application unit, and in a case where the controller receives the second type of image forming job, the controller permits the image forming apparatus to form an image on a recording material, causes the second conveyance unit to convey the recording material, and causes the display unit to display the error message that a failure has occurred in the varnish application unit.

2. The image forming system according to claim 1, wherein the varnish is an ultraviolet-curing type varnish, and wherein a failure of varnish application unit refers to a case where the failure sensor unit detects that at least either one of the varnish application roller and the ultraviolet radiation lamp is not operating.

3. The image forming system according to claim 1, wherein an image formed on a recording material by the image forming apparatus is a toner image, and wherein the image forming apparatus comprises:

an image forming unit configured to form a toner image on a recording material; and a fixing unit configured to fix the toner image by applying heat and pressure to the recording material.

* * * * *